US008194551B2

(12) United States Patent  
Tsirtsis et al.

(10) Patent No.: US 8,194,551 B2  
(45) Date of Patent: Jun. 5, 2012

(54) METHODS AND APPARATUS FOR NETWORK CONTROLLED MOBILE IP FLOW MOVEMENT

(75) Inventors: Georgios Tsirtsis, London (GB); Kalle Ahmavaara, San Diego, CA (US); Haipeng Jin, Carlsbad, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 12/469,432

(22) Filed: May 20, 2009

(65) Prior Publication Data

US 2009/0303881 A1    Dec. 10, 2009

Related U.S. Application Data

(60) Provisional application No. 61/060,075, filed on Jun. 9, 2008.

(51) Int. Cl.  
*H04L 12/26* (2006.01)

(52) U.S. Cl. ...................................................... 370/235

(58) Field of Classification Search ........... 370/230–235  
See application file for complete search history.

(56) References Cited

U.S. PATENT DOCUMENTS

| | | | |
|---|---|---|---|
| 2003/0073452 | A1 | 4/2003 | Omae et al. |
| 2003/0142673 | A1* | 7/2003 | Patil et al. ..................... 370/392 |
| 2005/0144321 | A1* | 6/2005 | Forsberg ....................... 709/245 |
| 2005/0207394 | A1* | 9/2005 | Takeyoshi et al. ............ 370/351 |
| 2006/0218298 | A1 | 9/2006 | Knapp et al. |
| 2008/0107123 | A1 | 5/2008 | Rune et al. |
| 2009/0303881 | A1* | 12/2009 | Tsirtsis et al. ................ 370/235 |

OTHER PUBLICATIONS

Eriksson, M. et. al.: "Mobile IPv6 Flow Routing over Multiple Care-of Addresses; drafteriksson-mext-mipv6-routing-rules-00," Internet Engineering Task Force, IETF; Standard-Working-Draft, Internet Society (ISOC) 4, Rue Des Falaises CH-1205 Geneva, Switzerland, Jun. 19, 2008, XP015057624 paragraphs [0001], [0004], [05.1], [0006].

"International Search Report and Written Opinion—PCT/US2009/046517—ISAEPO—Sep. 4, 2009".

Mitsuya, K. et al.: "A Policy Data Set for Flow Distribution: draft-mitsuya-monami6-flow-distribution-policy-04.txt," IETF Standard-Working-Draft, Internet Engineering Task Force, IETF, CH, No. 4, Aug. 2, 2007, XP015052013 ISSN: 0000-0004 paragraphs [0001], [03.1]-[03.3].

Park, C. et al.: "Interface selection for a multihomed mobile network: draft-park-mis01.txt," IETF Standard-Working-Draft, Internet Engineering Task Force, IETF, CH, No. 1, Oct. 19, 2006, XP015048427 ISSN: 0000-0004 abstract paragraphs [0001], [04.3].

* cited by examiner

*Primary Examiner* — Derrick Ferris  
*Assistant Examiner* — Mang Yeung  
(74) *Attorney, Agent, or Firm* — Kam T. Tam; James T. Hagler

(57) ABSTRACT

Methods and apparatus for network controlled mobile IP flow movement. An infrastructure node, such as a home agent, signals a mapping between care-of-addresses (CoAs) and flows to be transmitted from a mobile device in uplink communications. The CoA associated with each flow is determined from network, device, and/or flow information. A mobile node or mobile gateway receives the mapping and updates its local policy information. When a selected flow is to be transmitted in an uplink transmission, the local policy information is used to determine the CoA associated with the selected flow. The CoA is then used to determine an access network (or access path) on which the uplink transmission of the selected flow is to occur.

44 Claims, 7 Drawing Sheets

700

| Flow identifier 1 | Flow type | CoA identifier |
| --- | --- | --- |
| Flow identifier 2 | Flow type | CoA identifier |
| Flow identifier 3 | Flow type | CoA identifier |
| Flow identifier 4 | Flow type | CoA identifier |
| ⋮ | | |
| Flow identifier 5 | Flow type | CoA identifier |

702, 704, 706

METHODS AND APPARATUS FOR NETWORK CONTROLLED MOBILE IP FLOW MOVEMENT

CLAIM OF PRIORITY UNDER 35 U.S.C. §119

The present Application for Patent claims priority to U.S. Provisional Application No. 61/060,075 entitled "NETWORK CONTROLLED MIPv6 FLOW MOVEMENT" filed Jun. 9, 2008, and assigned to the assignee hereof and hereby expressly incorporated by reference herein.

BACKGROUND

1. Field

The present application relates generally to communication networks, and more particularly, to methods and apparatus for network controlled mobile IP flow movements.

2. Background

Internet protocol, such as MIPv6, allows a mobile node to redirect traffic sent to its home address (HoA) to its current location. The current location of the mobile node is identifiable by a care-of-address (CoA). The mobile node gets its CoA from the access network to which it is currently connected. Quite often, a mobile node may be connected to multiple access networks and therefore have multiple CoAs.

The mobile node registers its CoAs with a home agent so that the home agent can route packets transmitted on a downlink to the correct address to reach the mobile node. Since the home agent has knowledge of all the CoAs associated with the mobile node, it can control which access network is used for any particular downlink transmission to the mobile node. Similarly, the mobile node can also select the access network to be used for any particular uplink transmission.

Heretofore, there has not been any operable scheme for conventional systems to allow an infrastructure node, such as a home agent, to control a mobile node to perform uplink transmissions using a specific access network. For instance, it would be desirable to have the mobile node use a particular access network for a particular uplink transmission that requires high bandwidth. However, it does not appear that current systems allow the network to control the mobile node to transmit the flow using that particular access network. This places limitations on the operation of the network since operators cannot impose routing policies on mobile nodes to best utilize network resources. Even in the scenarios that superior quality or excess bandwidth may be available on a given access network, but since the network infrastructure is unable to control the mobile to utilize that access network for a given uplink transmission, available network resources are not fully utilized.

Therefore, there is a need to have a mechanism that allows network infrastructure to control mobile IP flow movements on uplink communications from mobile nodes.

SUMMARY

A mobile IP flow control system, embodies as various methods and apparatus, operates to allow network infrastructure to control which access network is used for uplink transmissions of packet flows from a mobile device. For example, an infrastructure node, such as a home agent, uses extensions to a binding acknowledgment message to signal a mapping between CoAs and flows to be transmitted from a mobile device in uplink communications. The infrastructure node determines the CoA to be mapped to each flow based on network, device, and/or flow information. The mobile node or mobile gateway receives the binding acknowledgement message and updates its local policy information with the CoA to flow mapping. When a selected flow is to be transmitted in an uplink transmission, the local policy information is used to determine the CoA associated with the selected flow. The CoA is then used to determine an access network (or access path) on which the uplink transmission of the selected flow is to occur. Thus, the network infrastructure is able to control mobile IP flow movements on communication uplinks associated with a mobile node or mobile gateway.

BRIEF DESCRIPTION OF THE DRAWINGS

The foregoing implementations described herein will become more readily apparent by reference to the following Description when taken in conjunction with the accompanying drawings wherein.

DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The following description describes a mobile Internet Protocol (IP) flow control system that operates to allow network infrastructure to control mobile IP flow movements associated with uplink communications.

Figure 1:
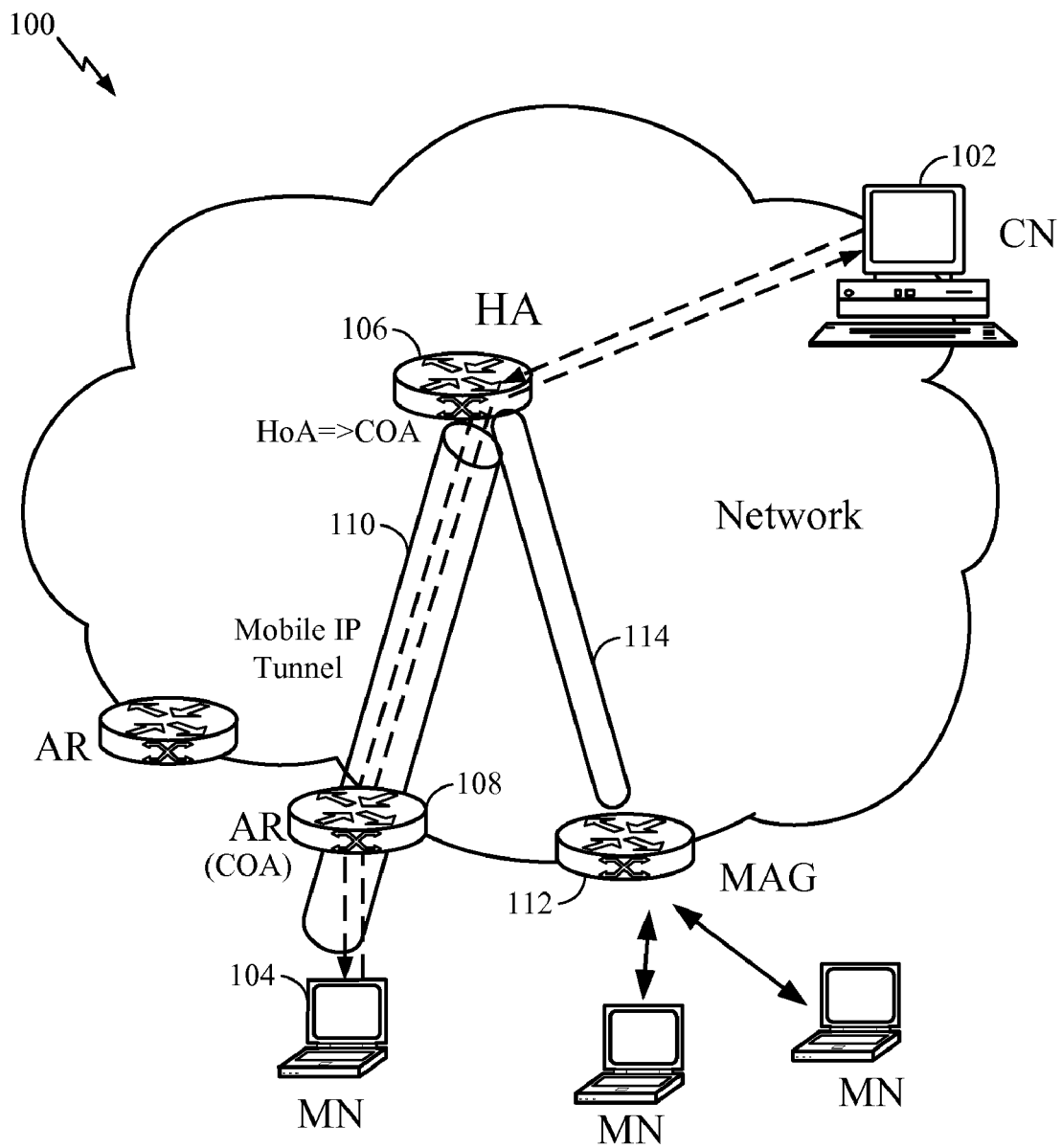
FIG. 1 shows a network that illustrates conventional mobile IP flow routing.

FIG. 1 shows a network 100 that illustrates conventional mobile IP flow routing. For example, the network 100 is suitable for operation according to the network protocol MIPv6. The network 100 comprises a correspondent node (CN) 102 that is capable of communicating with a mobile node (MN) 104. The MN 104 may be a cell phone, paging device, email device, mobile computer, Personal Digital Assistant (PDA), handset, User Equipment (UE) or any other type of device oeprable to communicate with the network 100. Packet flows from the CN 102 are addressed to the home address of the MN 104 and are received at a home agent (HA) 106 associated with the mobile node. The HA 106 may be an infrastructure node, mobility anchor, gateway, PDN gateway or any other suitable infrastructure entity. The HA 106 maintains a cache that maps the HoA of the MN 104 to an associated CoA. During operation, the MN 104 transmits a binding update (BU) message to the HA 106 that identifies a binding between the HoA and CoA associated with the MN 104. The HA 106 uses this information to update the cache.

When the HA 106 receives packets from the CN 102 that are addressed to the HoA of the MN 104, the HA 106 obtains from the cache the CoA associated with the HoA and uses a mobile IP tunnel 110 to this CoA to direct the packets from the CN 102 to the MN 104 via the access router (AR) 108. The mobile IP tunnel 110 is established when a binding update is exchanged between a mobile node and the HA 106. Thus, using conventional IP routing, IP packets directed to a mobile node can be routed through a home agent where they are redirected to the mobile node based on a registered CoA.

Referring to FIG. 1, the following information further describes conventional packet routing. Packets transmitted from the CN 102 to the MN 104 include the following IP header information.
1. Source address=CN address
2. Destination address=home address (HoA) of MN Packets transmitted from the HA 106 to the MN 102 include the following IP header information.
1. Source address=HA address
2. Destination address=CoA of MN
3. Encapsulated source address=CN addr
4. Encapsulated destination address=HoA Packets transmitted from the MN 104 to the HA 106 include the following IP header information.
1. Source address=CoA
2. Destination address=HA address
3. Encapsulated source address=HoA of MN
4. Encapsulated destination address=CN addr Packets transmitted by the MN 106 to the CN 102 include the following IP header information.
1. Source address=HoA of MN
2. Destination address=CN address In a variation of the conventional mobile IP routing, referred to as proxy MIPv6 (PMIPv6), a mobile access gateway (MAG) 112 is provided that operates to provide communications to multiple MNs. The function of the MAG 112 is to unburden the MNs from having to register CoAs with the HA 106 as they move around the network 100. During operation, the MAG 112 communicates with multiple MNs and registers CoAs with the HA 106 for those MNs. When the CN 102 transmits packets to any of the MNs in communication with the MAG 112, the HA 106 receives these packets and uses its binding information to determine the appropriate CoA based on the HoA for the particular MN. The HA 106 then uses a mobile IP tunnel 114 determined from the CoA to tunnel the packets received from the CN 102 to the MAG 112. The MAG 112 then operates to distribute the packets to the appropriate MN.

As described, conventional mobile IP routing, such as provided by MIPv6 and PMIPv6, operates to allow IP packets transmitted on a downlink to be redirected to MNs in a communication network.

Figure 2:
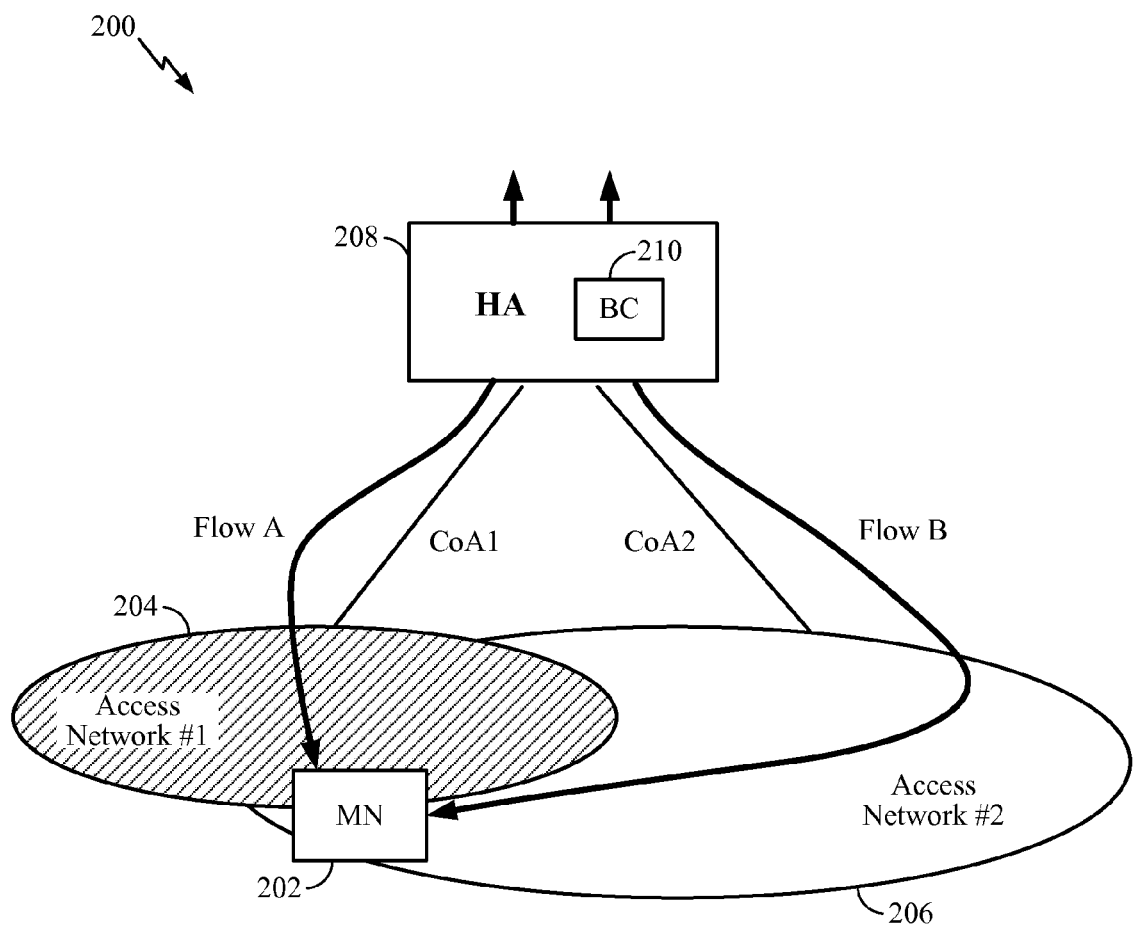
FIG. 2 shows a schematic drawing that illustrates how conventional mobile IP flow routing supports multiple CoAs for use with a single mobile node.

FIG. 2 shows a schematic drawing 200 that illustrates how conventional mobile IP routing supports multiple CoAs for use with a single mobile node. A MN 202 is shown that in communication with two access networks 204 and 206. For example, access network #1 204 may be a cellular network and the access network #2 206 may be a wireless LAN. The MN 202 registers CoA1 and CoA2 associated with the access networks with a HA 208. The HA 208 maintains the registrations in a binding cache (BC) 210. During downlink communications, the HA 208 uses the BC 210 and local policy information to tunnel packet flow A to the MN 202 using CoA1 and access network #1 204. The HA 208 also tunnels packet flow 2 to the MN 202 using CoA2 and access network #2 206. Thus, the HA 208 uses its BC 210 and policy information to determine the path for downlink flows to the MN 202.

During uplink communications, the MN 202 can associate a given application flow with a given CoA and can change these associations at will. Thus, the MN 202 has control over which access networks are used for any particular packet flow transmitted in an uplink communication. It should be noted that although a mobile node is shown in FIG. 2, the operations described with respect to the MN 202 are also applicable to a MAG. Therefore, during conventional mobile IP flow routing, the HA 208 determines packets flow routing on the downlink and the MN 202 determines packet flow routing on the uplink.

Figure 3:
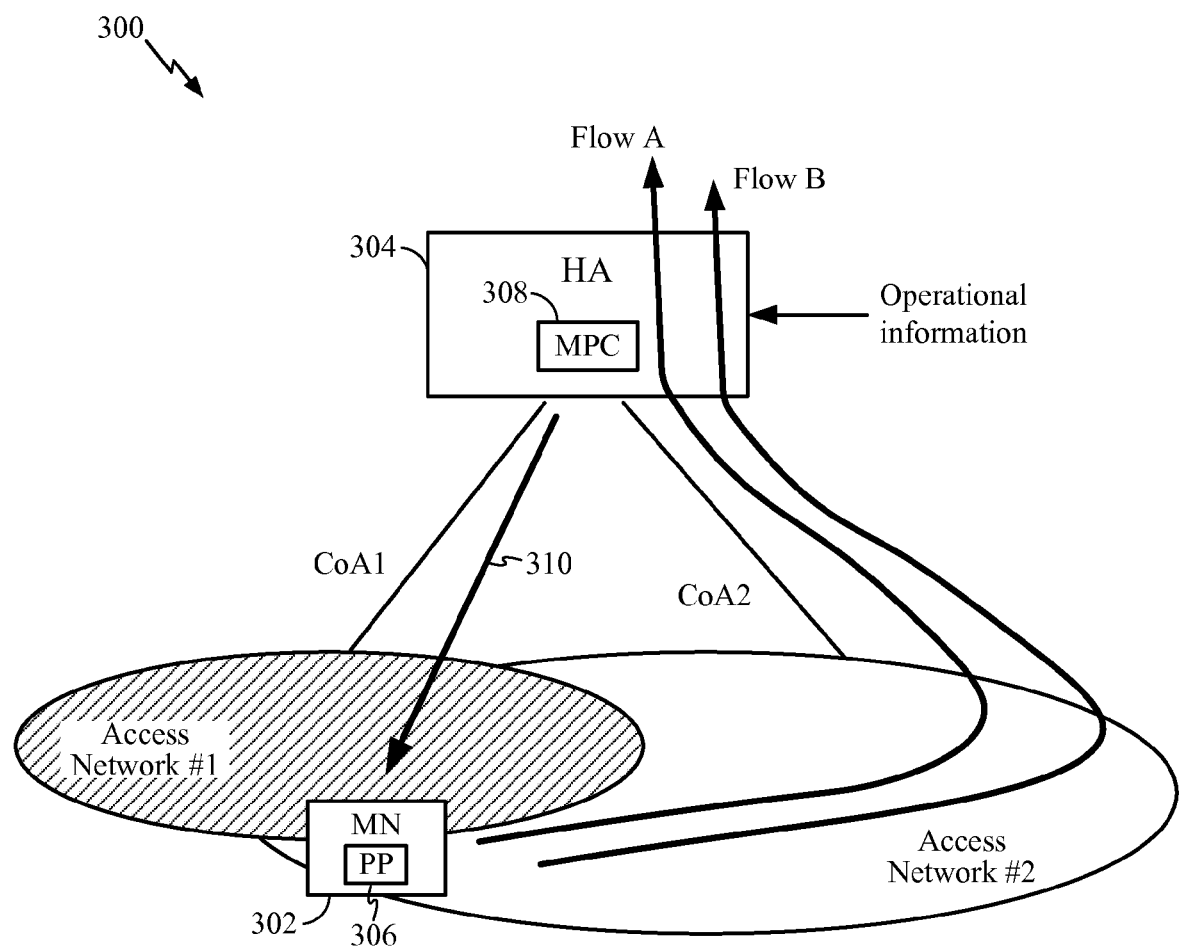
FIG. 3 shows a schematic drawing that illustrates the operation of a mobile IP flow control system.

FIG. 3 shows a schematic drawing 300 that illustrates the operation of a mobile IP flow control system. For example, FIG. 3 illustrates how a network infrastructure node, such as a home agent, is able to control which access networks or access paths are used for uplink communications by a mobile device or mobile gateway.

MN 302 is in communication with multiple access networks (access networks #1 and #2). For example, access network #1 may be a cellular network and access network #2 may be a wireless LAN. The MN 302 operates to register two CoAs (CoA1 and CoA2) with a HA 304 so that packets transmitted to the MN 302 can be routed by the HA 304 to the MN 302 using tunnels associated with either or both of the CoAs.

The HA 304 has access to network operational information, among other things, QoS information, network throughput information, network loading, and other types of network operational information. The HA 304 comprises a mobile policy controller (MPC) 308. The MPC 308 processes the network operational information and any other information to determine how flows transmitted from the MN 302 in uplink communications are to be routed. For example, the MPC 308 has access to device information, such as memory or processing capacity, and flow information, such as flow type (i.e., data, multimedia, etc.).

Using any of the available information (network, device, flow), the MPC 308 determines that flow A and flow B are to be transmitted from the MN 302 in uplink communications utilizing access network #2 associated with CoA2. To implement this determination, the MPC 308 transmits message 310 to the MN 306 to indicate CoAs to be associated with flows transmitted from the MN 302 in uplink transmissions. Although the message 310 is shown as being transmitted over access network #1, the message 310 may be transmitted to the MN 306 using access network #2 or using any other type of access path to the MN 306.

In one implementation, the message 310 is a binding acknowledgement (BA) message that is transmitted in response to a binding update message (BU) received from the MN 302 during CoA registration. In yet another implementation, the message 310 is a generic notification (GN) message that is used to provide information to the MN 302 or its user; but which is extended to include the CoA mappings described above. In another implementation, the message may be any other type of message that is transmitted to the MN 302 from a network infrastructure node and which indicates flow to CoA mappings.

The MN 302 comprises a policy processor (PP) 306. The PP 306 operates to received the message 310 and incorporate the flow to CoA mappings into local policy information that is used by the MN 302 to determined flow routings for uplink communications. For this example, it will be assumed that the message 310 indicates that flow A and flow B are mapped to CoA2 which is associated with access network #2. The PP 306 then operates to control the uplink transmissions from the MN 302 so that flows A and B are transmitted using the access network #2.

As described, implementations of the mobile IP flow control system are operable to allow network node (i.e., HA, infrastructure elements, network operators, etc.) to control which access networks a MN uses for uplink communication of particular flows. It should be noted that the system is also applicable to the operation of MAGs.

Figure 4:
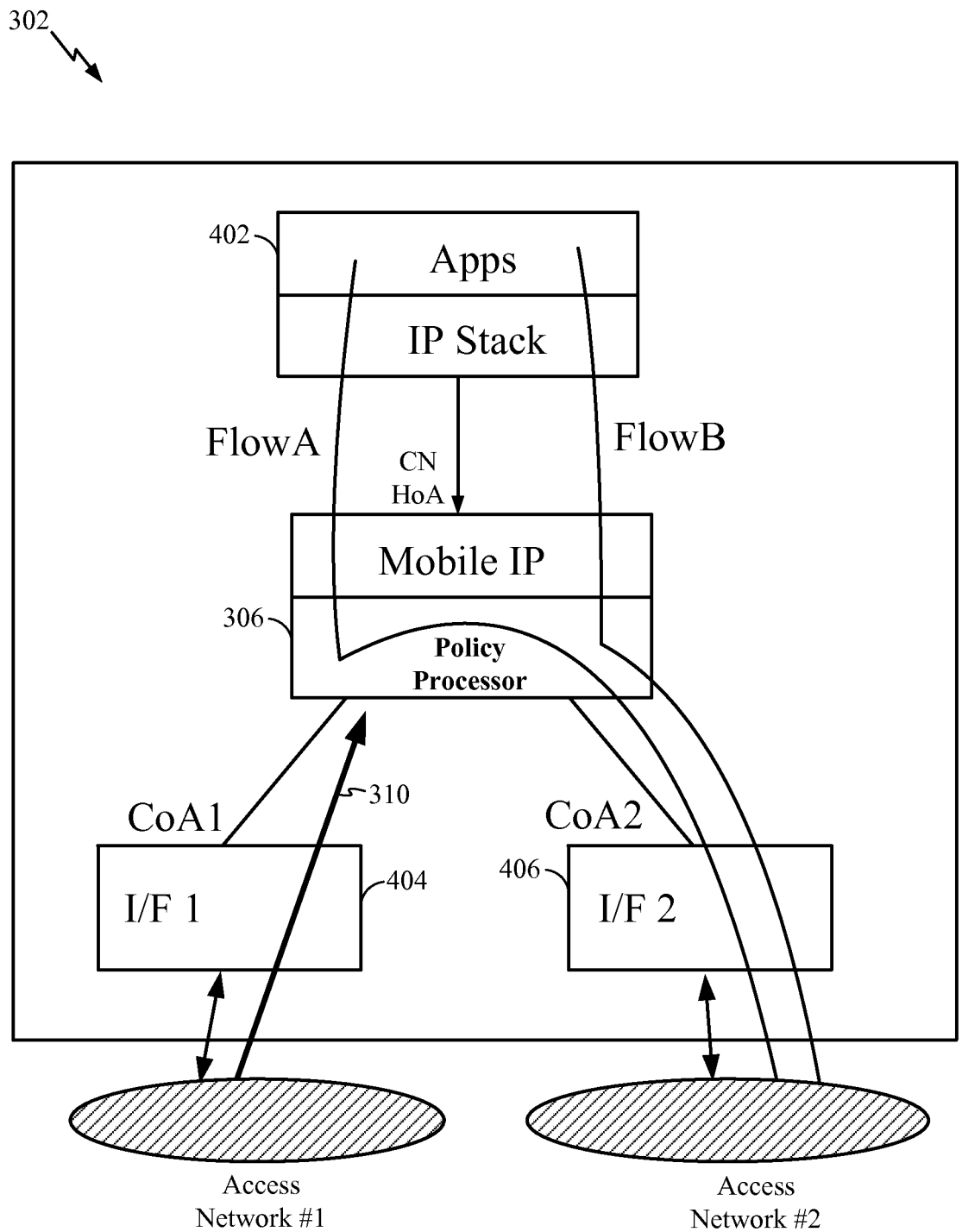
FIG. 4 shows a schematic drawing of a mobile node illustrated in FIG. 3.

FIG. 4 shows a simplified schematic drawing of the MN 302 as illustrated in FIG. 3. The MN 302 comprises physical interfaces 404 and 406 that operate to provide communication with access networks #1 and #2, respectively. Applications 402 generate flows A and B for uplink transmission to a CN via its associated HoA using one of the access networks #1 or #2.

During operation, the message 310 is received from the HA 304, which provides a mapping between flows and CoAs. For example, the message 310 may be a BA message, GN message, or any other type of message that indicates that flows A and B are to be transmitted over the access network associated with CoA2. The message 310 is passed to the PP 306. The PP 306 operates to decode the message 310 and incorporate the flow to CoA mappings into local policy information.

When the flows A and B reach the PP 306 from the applications 402, the PP 306 operates to determine the CoAs associated with each of these flows from the local policy information. Once the CoAs are determined, the PP 306 operates to route these flows for uplink transmission over access networks associated with those CoAs. For example, the flows will be transmitted using tunnels associated with those CoAs. In this case, both flows are routed for uplink transmission over the access network #2 that is associated with CoA2.

As described, the mobile IP flow control system, allows network infrastructure to control which access networks or access paths are used to transmit particular flows in uplink transmissions from a mobile node or mobile gateway.

Figure 5:
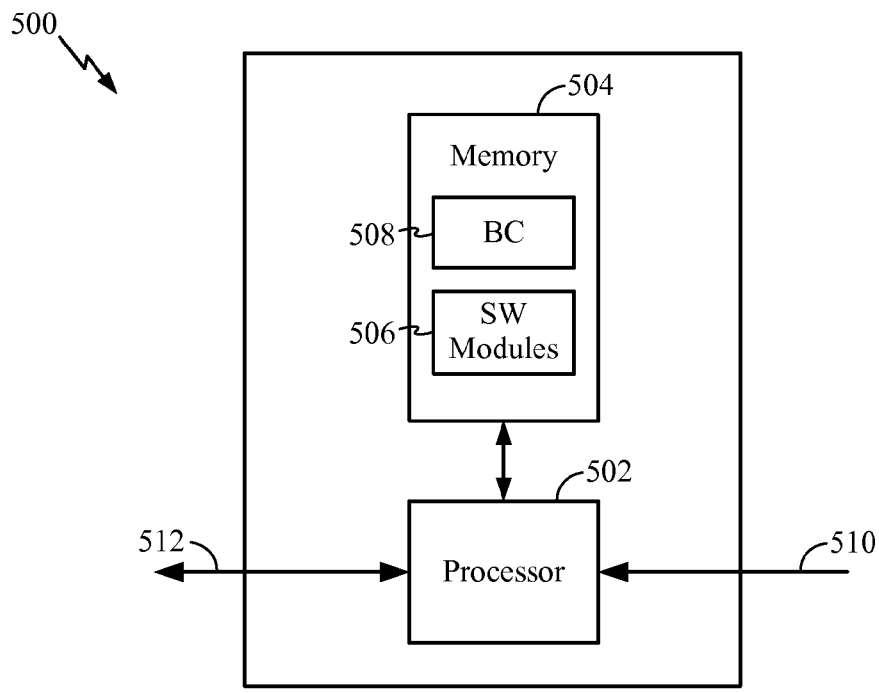
FIG. 5 shows an exemplary mobile policy hardware for use in an infrastructure node to provide a mobile IP flow control system.

FIG. 5 shows an exemplary mobile policy hardware, such as an MPC 500 for use in a mobile IP flow control system. For example, the MPC 500 is suitable for use in a network infrastructure node, such as the home agent 304 shown in FIG. 3. The MPC 500 comprises a processor 502 coupled to a memory 504. It should be noted that the MPC 500 is just an exemplary implementation and that other implementations are possible.

The memory 504 comprises a storage device, ASIC, or any combination thereof. The memory 504 operates to store a BC 508 and control software (CSW) modules 506. The BC 508 comprises binding information that maps HoA of network devices, such as mobile nodes, to associated CoAs. It is possible that the HoA of a device, such as a mobile node, be map to more than one CoA. The CSW modules 506 comprises any suitable applications, codes, instructions or any other type of software that can be executed by the processor 502 to perform the functions described herein.

The processor 502 comprises a Central Processing Unite (CPU), gate array, hardware logic, memory elements, circuitry, firmware and/or any combination thereof. The processor 502 operates to execute the CSW modules 506 to perform the functions described herein. The processor 502 comprises a communication link 510 to receive network information and a message link 512 to send and receive message with devices, such as mobile devices.

During a binding registration process, the processor 502 receives BU messages over the message link 512 from mobile devices or mobile gateways. The processor 502 decodes the BU messages to update the BC 508 with binding information. The processor 502 also receives network information over network link 510. The network information comprises QoS information, network capacity, network loading, and/or any other information related to one or more access networks. The processor 502 also receives device and flow information. For example, the device information may be received from the BU message or the network and indicates the type of device and any other parameters associated with the device, such as processing or link capacity. The flow information is received from the device or the network and indicates the type of flow (such as data or multimedia) and any other characteristics associated with the flow.

The processor 502 operates to process the network, device and flow information to determine which CoAs are to be associated with uplink communications of particular flows transmitted from particular mobile nodes or mobile gateways. For example, the processor 502 determines that uplink transmissions of multimedia flows from a particular mobile node are to use a particular access network associated with a particular CoA.

In one implementation, the 502 operates to incorporate flow to CoA mappings into a BA message that is transmitted using the message link 512 to a mobile node in response to a BU message. The mobile node process the BA message to incorporate the flow to CoA mappings into its local policy information. When a flow is to be transmitted in an uplink transmission, the local policy information at the mobile node is used to determine which access network and/or tunnel to use for the uplink transmission based on the CoA associated with that flow. Thus, the MPC 500 is operable to control mobile IP flow movements in uplink communications from MNs and MAGs.

In the exemplary embodiment, the mobile IP flow control system comprises a computer program product having one or more program instructions ("instructions") or sets of "codes" stored or embodied on a machine-readable medium. When the codes are executed by at least one processor, for instance, the processor 502, their execution causes the MPC 500 to provide the functions of the mobile IP flow control system described herein. For example, the machine-readable medium comprises a floppy disk, CDROM, memory card, FLASH memory device, RAM, ROM, or any other type of memory device or machine-readable medium contained within or coupled to the MPC 500. The sets of codes, when executed, operate to provide a mobile IP flow control system as described herein.

Figure 6:
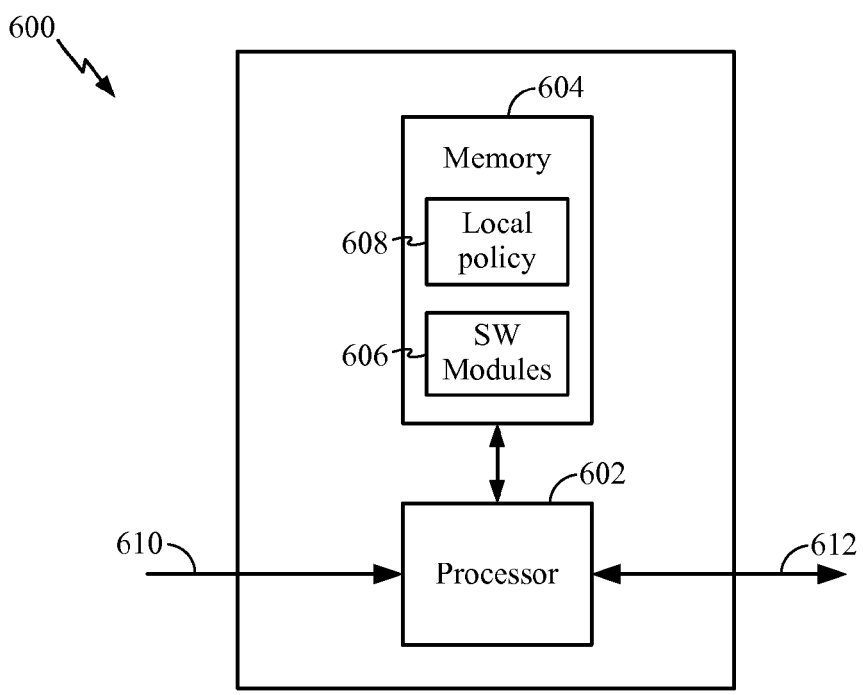
FIG. 6 shows an exemplary policy hardware for use in a mobile node or mobile gateway to provide a mobile IP flow control system.

FIG. 6 shows an exemplary hardware implementation, such as a policy processor 600 for use in a mobile IP flow control system. For example, the PP 600 is suitable for use in a mobile node or mobile gateway, for instance, at the MN 302 shown in FIG. 4 or the MAG 112 shown in FIG. 1. The PP 600 comprises processor 602 coupled to memory 604. It should be noted that the PP 600 is just an exemplary implementation and that other implementations are possible.

The memory 604 comprises a storage device, ASIC, or any combination thereof. The memory 604 operates to store local policy information 608 and policy software (PSW) modules

606. The local policy information 608 comprises a mapping between flows and CoAs. For example, if the PP 600 is located in a mobile node, the local policy information 608 comprises a mapping between flows and CoAs associated with the mobile node.

The PSW modules 606 comprises any suitable applications, codes, instructions or any other type of software that can be executed by the processor 602 to perform the functions described herein.

The processor 602 comprises a CPU, gate array, hardware logic, memory elements, circuitry, firmware and/or any combination thereof. The processor 602 operates to execute the PSW modules 606 to perform the functions described herein. The processor 602 comprises a message link 610 to send and receive messages with network infrastructure devices, such as home agents.

Assuming the PP 600 is located at a mobile node that is in communication with multiple access networks, a binding registration process occurs. During the binding registration process, the MN transmits a BU message to its home agent to inform the home agent of the CoAs associated with each access network at which the MN can be reached. In response, the home agent transmits a BA message that comprises flow to CoA mappings as described above with reference to the MPC 500.

The processor 602 receives the BA message from the home agent over the message link 610. The processor 602 decodes the BA messages to obtain the flow to CoA mappings that are used to update the local policy information 608. It should be noted that the processor may also receive a GN message or any other message containing the flow to CoA mappings.

During operation, an application at the MN generates a flow for uplink transmission to a CN. Information identifying the flow is provided to the processor 602 through the communication link 612. For example, the link 612 allows the processor 602 to communicate with other entities at the MN to obtain the information about the flow.

The processor 602 operates to query the local policy information 608 to determine a CoA associated with that flow. Once a CoA is determined, the processor 602 signals the CoA to a transceiver at the MN using the link 612 so that the flow can be transmitted in an uplink communication using a tunnel and/or access network associated with that CoA. Thus, the PP 600 is operable to control mobile IP flow movements based on flow to CoA mappings received from a network infrastructure node, such as a home agent.

In the exemplary embodiment, the mobile IP flow control system comprises a computer program product having one or more program instructions ("instructions") or sets of "codes" stored or embodied on a machine-readable medium. When the codes are executed by at least one processor, for instance, the processor 602, their execution causes the PP 600 to provide the functions of the mobile IP flow control system described herein. For example, the machine-readable medium comprises a floppy disk, CDROM, memory card, FLASH memory device, RAM, ROM, or any other type of memory device or machine-readable medium contained within or coupled to the PP 600. The sets of codes, when executed, operate to provide a mobile IP flow control system as described herein.

Figures 7, 8:
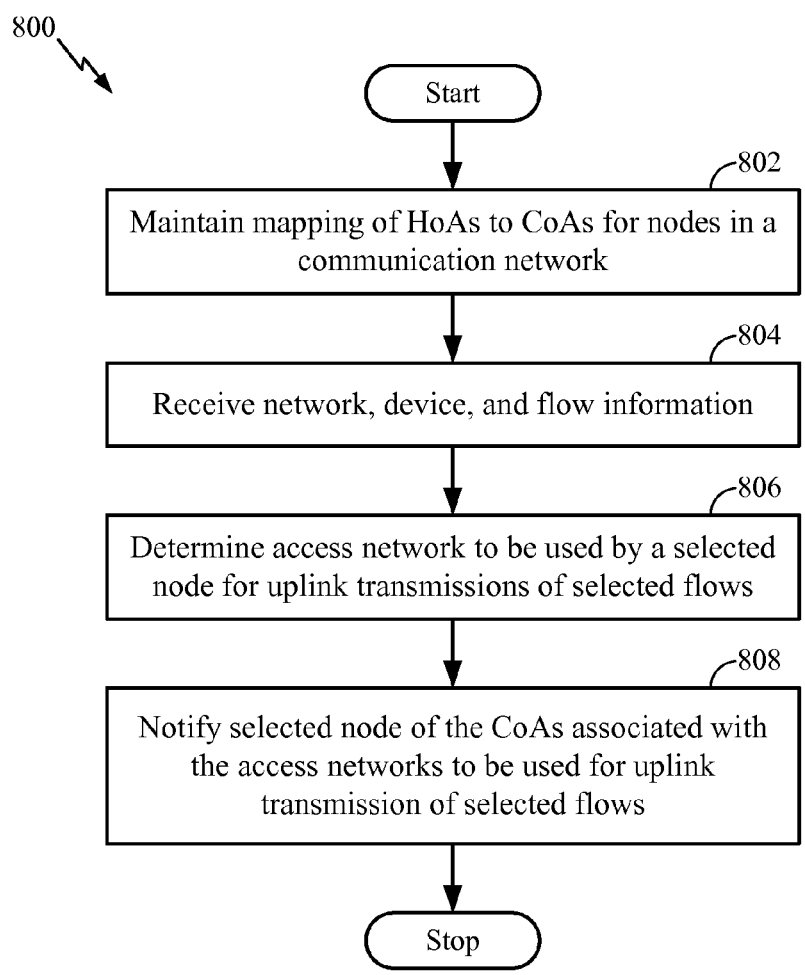
FIG. 7 shows a message structure for use in a mobile IP flow control system
FIG. 8 shows an exemplary method for operating a mobile policy controller in an infrastructure node to provide a mobile IP flow control system.

FIG. 7 shows an exemplary message structure 700 for use in a mobile IP flow control system. For example, the message structure 700 may be part of a BA message transmitted from a HA to a mobile node or mobile gateway. The message structure 700 may also be used as part of a generic notification message or any other message type.

The message structure 700 comprises a flow identifier 702 that identifies a particular flow. The message structure 700 also comprises a flow type identifier 704 that identifiers a particular flow type. The message structure 700 also comprises a CoA identifier 706 that identifies a particular CoA.

Thus, the message structure 700 operates to allow a network infrastructure node, such as a HA, to provide a mapping of flows to CoAs to mobile devices and mobile gateways.

FIG. 8 shows an exemplary method 800 for operating a MPC in an infrastructure node to provide a mobile IP flow control system. For example, the method 800 may be performed by the MPC 500 operating at a home agent in a communication network. For illustration, the method 800 is described below with reference to the MPC 500 shown in FIG. 5. For example, the processor 502 executes one or more sets of codes that are part of the CSW 506 to control the MPC 500 to perform the functions described below.

At block 802, a mapping between HoAs and CoAs for nodes in a communication network is maintained. For example, the processor 502 receives BU messages from one or more mobile nodes that include mappings between HoAs and CoAs. The processor 502 uses this information to update the BC 508. Thus, HoA to CoA mappings are generated and maintained.

At block 804, network, device, and flow information is received. For example the network information identifies various network operational parameters, such as QoS, network bandwidth, loading and/or any other network parameters. The device information comprises device type, processing power, link capacity and/or any other device information. The flow information comprises flow type, data rate and/or any other flow information. For example, the network, device, and flow information is received by the processor 502 from the network over the link 510 and/or from interactions with one or more mobile devices.

At block 806, access networks or access paths to be used by selected nodes for uplink transmissions of selected flows are determined. For example, with respect to a selected MN coupled to multiple access networks, the network, device, and flow information is used to determine which access network is to be used for uplink transmission of selected flows. For example, the information is used to determine which access network is to be used for the uplink transmission of data flows and which access network is to be used for the uplink transmission of multimedia flows.

These access network determinations are incorporated into a flow to CoA mapping. For example, with respect to a particular MN, each registered CoA is associated with a particular access network. Therefore, mapping a flow to the corresponding CoA allows the MN to determine in an efficient manner the access network to be used for the uplink communication of the particular flow.

At block 808, the selected node is notified of the flow to CoAs mappings. For example, the processor module 502 assembles a BA message that comprises the mapping of flows to CoAs. The BA message is transmitted to the mobile node using the communication link 512. In another implementation, the flow to CoA mappings is transmitted as part of a GN message or as part of any other message type.

As described, the method 800 operates to describe the operation of a MPC in an infrastructure node, such as a home agent, to provide a mobile IP flow control system. It should be noted that the method 800 is just one implementation and that the operations of the method 800 may be rearranged or otherwise modified.

Figure 9:
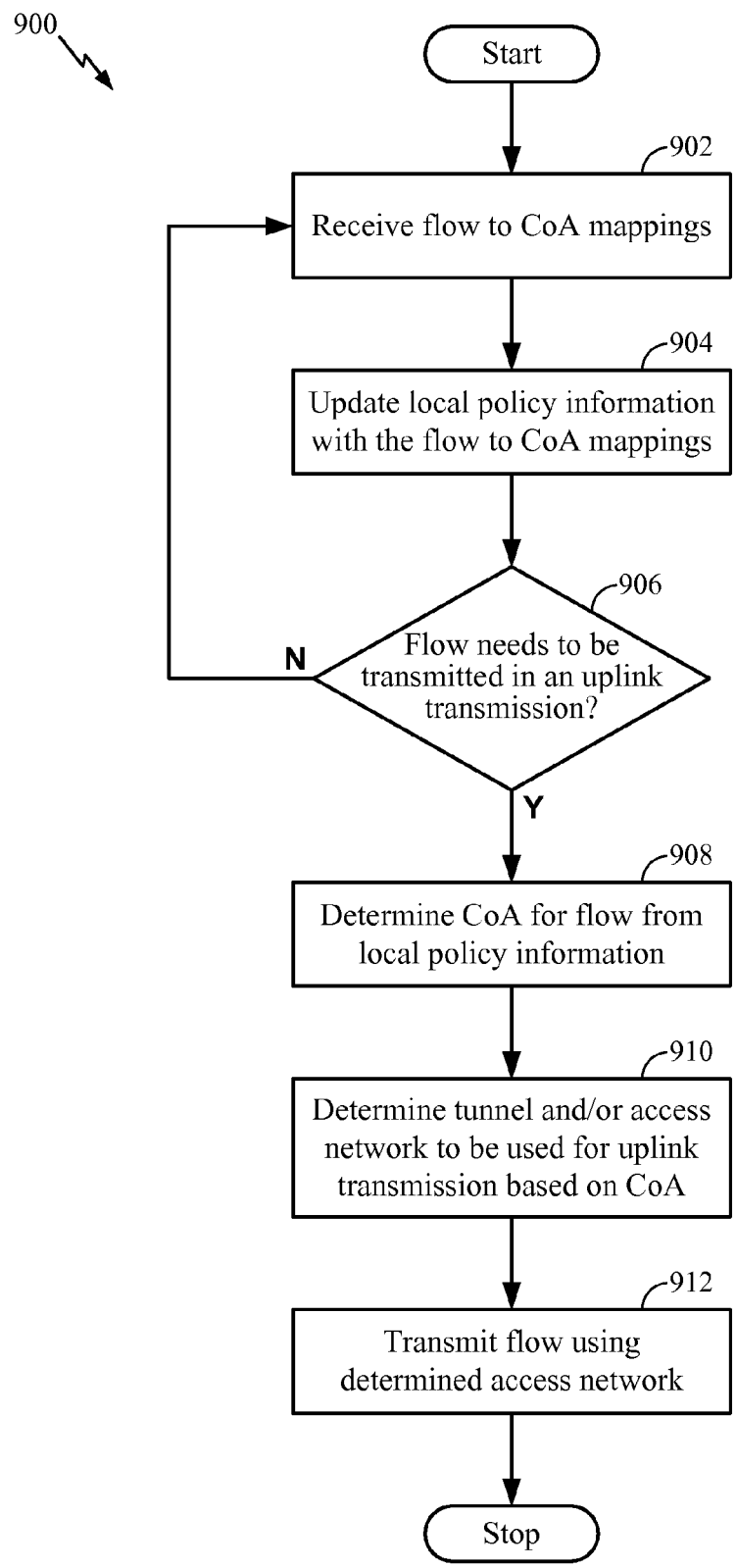
FIG. 9 shows an exemplary method for operating a policy processor in a mobile node or mobile gateway to provide a mobile IP flow control system.

FIG. 9 shows an exemplary method 900 for operating a policy processor in a mobile node or mobile gateway to provide a mobile IP flow control system. For clarity, the method 900 is described below with reference to the PP 600 shown in FIG. 6. For example, the processor 602 executes one or more sets of codes that are part of the PSW 606 to control the PP 600 to perform the functions described below.

At block 902, flows to CoAs mappings are received. For example, a BA message from a HA is received on the link 610 by the processor 602 that comprises mappings between flows and CoAs associated with the MN. In one implementation, the BA message includes the message structure 700, which provides the flows to CoAs mappings.

At block 904, local policy information is updated with the CoAs. For example, the processor 602 updates the local policy information 608.

At block 906, a determination is made as to whether a flow needs to be transmitted in an uplink transmission. For example, the processor 602 determines from the link 612 whether or not an application at the MN needs to transmit a flow in an uplink transmission. If a flow needs to be transmitted in an uplink transmission, the method proceeds to block 908. Otherwise, the method proceeds to block 902.

At block 908, a CoA for the flow is determined from the local policy information. For example, the processor 602 accesses the local policy information 608 to determine a CoA associated with the selected flow to be transmitted.

At block 910, a tunnel and/or access network for the uplink transmission is determined. For example, the processor 602 uses the CoA associated with the flow to determine the tunnel and/or access network to use for the uplink transmission.

At block 912, the flow is transmitted on the uplink using the determined tunnel and/or access network. For example, the processor 602 passes the information identifying the tunnel and/or access network to the transmission logic at the MN using the link 612. The transmission logic then performs the uplink transmission using the appropriate access path.

As described, the method 900 describes the operation of a policy processor in a mobile node or mobile gateway to provide a mobile IP flow control system. It should be noted that the method 900 is just one implementation and that the operations of the method 900 may be rearranged or otherwise modified.

The various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In the exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

This description is provided to enable any person skilled in the art to make or use the present invention. Various modifications may be readily apparent to those skilled in the art, and the generic principles defined herein may be applied to other implementations, e.g., in an instant messaging service or any general wireless data communication applications, without departing from the spirit or scope of the invention. Thus, the present invention is not intended to be limited to the implementations shown herein but is to be accorded the widest scope consistent with the principles and novel features disclosed herein. The word "exemplary" is used exclusively herein to mean "serving as an example, instance, or illustration." Any implementation described herein as "exemplary" is not necessarily to be construed as preferred or advantageous over other implementation.

Accordingly, while implementations of a mobile IP flow control system have been illustrated and described herein, it will be appreciated that various changes can be made without departing from their spirit or essential characteristics. Therefore, the disclosures and descriptions herein are intended to be illustrative, but not limiting, of the scope of the invention, which is set forth in the following claims.

What is claimed is:

1. An apparatus operable to provide flow control in a communication network, comprising:
a processor; and
a memory coupled to the processor, wherein the processor is configured to:
receive a message that comprises a mapping between flows and care-of-addresses (CoAs), wherein the mapping sets forth how flows transmitted from the apparatus in uplink communications are to be routed;
update local policy information based on the mapping;
identify a selected flow to be transmitted in an uplink transmission;
determine a selected CoA associated with the selected flow based on the local policy information;
determine an access network associated with the selected CoA; and
cause the selected flow to be transmitted in an uplink transmission over the access network.

2. The apparatus of claim 1, wherein the message is one of a binding acknowledgment message and a generic notification message.

3. The apparatus of claim 1, wherein the apparatus is one of a mobile node and a mobile access gateway.

4. The apparatus of claim 1, wherein said processor is configured to receive the message from an infrastructure node of the communication network.

5. The apparatus of claim 4, wherein the infrastructure node is a home agent.

6. A communication node operable to provide flow control in a communication network, comprising:
means for receiving a message that comprises a mapping between flows and care-of-addresses (CoAs), wherein the mapping sets forth how flows transmitted from the communication node in uplink communications are to be routed;
means for updating local policy information based on the mapping;
means for identifying a selected flow to be transmitted in an uplink transmission;
means for determining a selected CoA associated with the selected flow based on the local policy information;
means for determining an access network associated with the selected CoA; and
means for causing the selected flow to be transmitted in an uplink transmission over the access network.

7. The communication node of claim 6, wherein the message is one of a binding acknowledgment message and a generic notification message.

8. The communication node of claim 6, wherein the node is one of a mobile node and a mobile access gateway.

9. The communication node of claim 6, wherein said means for receiving comprises means for receiving the message from an infrastructure node of the communication network.

10. The communication node of claim 9, wherein the infrastructure node is a home agent.

11. A method operable by a communication apparatus to provide flow control in a communication network, comprising:
receiving a message that comprises a mapping between flows and care-of-addresses (CoAs), wherein the mapping sets forth how flows transmitted from the communication apparatus in uplink communications are to be routed;
updating local policy information;
identifying a selected flow to be transmitted in an uplink transmission;
determining a selected CoA associated with the selected flow based on the local policy information;
determining an access network associated with the selected CoA; and
causing the selected flow to be transmitted in an uplink transmission over the access network.

12. The method of claim 11, wherein the message is one of a binding acknowledgment message and a generic notification message.

13. The method of claim 11, wherein the communication apparatus is one of a mobile node and a mobile access gateway.

14. The method of claim 11, wherein said receiving comprises receiving the message from an infrastructure node of the communication network.

15. The method of claim 14, wherein the infrastructure node is a home agent.

16. A non-transitory computer-readable medium having stored thereon computer executable instructions configured to cause a computer to perform operations to provide flow control in a communication network, the operations comprising:
receiving a message that comprises a mapping between flows and care-of-addresses (CoAs), wherein the mapping sets forth how flows transmitted from the computer in uplink communications are to be routed;
updating local policy information based on the mapping;
identifying a selected flow to be transmitted in an uplink transmission;
determining a selected CoA associated with the selected flow based on the local policy information mapping;
determining an access network associated with the selected CoA; and
causing the selected flow to be transmitted in an uplink transmission over the access network.

17. The non-transitory computer-readable medium of claim 16, wherein the message is one of a binding acknowledgment message and a generic notification message.

18. The non-transitory computer-readable medium of claim 16, wherein the non-transitory computer-readable medium is contained within one of a mobile node and a mobile access gateway.

19. The non-transitory computer-readable medium of claim 16, wherein said codes are further configured to receive the message from an infrastructure node of the communication network.

20. The non-transitory computer-readable medium of claim 19, wherein the infrastructure node is a home agent.

21. An infrastructure apparatus operable to provide for flow control in a communication network, the infrastructure apparatus comprising: a processor; and a memory coupled to the processor,
wherein the processor is configured to: maintain a mapping between home addresses (HoAs) and care-of addresses (CoAs) associated with one or more nodes; maintain multiple CoAs associated with a selected node, wherein each CoA identifies one of a plurality of access networks associated with the selected node;
determine access networks to be used for uplink transmissions of flows from the selected node, wherein the determined access networks are the plurality of access networks associated with the selected node;
determine selected CoAs associated with the selected node, wherein the selected CoAs identifies the determined access networks; and
transmit a message to the selected node, wherein the message comprises a mapping between the flows and the selected CoAs, wherein the mapping sets forth how the flows transmitted from the selected node in the uplink communications are to be routed.

22. The infrastructure apparatus of claim 21, wherein said processor and said memory are further configured to determine the selected CoA based on at least one parameter selected from network, device, and flow parameters.

23. The infrastructure apparatus of claim 22, wherein the network parameters comprise at least one of a quality-of-service (QoS) parameter, a network bandwidth parameter, a network loading parameter, and a flow type parameter.

24. The infrastructure apparatus of claim 21, wherein the message is at least one of a binding acknowledgement (BA) message and a generic notification (GN) message.

25. The infrastructure apparatus of claim 21, wherein the selected node comprises one of a mobile node (MN) and a mobile access gateway (MAG).

26. The infrastructure apparatus of claim 21, wherein the infrastructure node comprises a home agent.

27. An infrastructure node operable to provide for flow control in a communication network, the infrastructure node comprising:
  means for maintaining a mapping between home addresses (HoAs) and care-of-addresses (CoAs) associated with one or more nodes;
  means for maintaining multiple CoAs associated with a selected node, wherein each CoA identifies one of a plurality of access networks associated with the selected node;
  means for determining access networks to be used for uplink transmissions of flows from a selected node, wherein the determined access networks are the plurality of access networks associated with the selected node;
  means for determining selected CoAs associated with the selected node, wherein the selected CoAs identifies the determined access networks; and
  means for transmitting a message to the selected node, wherein the message comprises a mapping between the flows and the selected CoAs, wherein the mapping sets forth how the flows transmitted from the selected node in the uplink communications are to be routed.

28. The infrastructure node of claim 27, wherein said means for determining comprises means for determining the selected CoA based on at least one parameter selected from network, device, and flow parameters.

29. The infrastructure node of claim 28, wherein the network parameters comprise at least one of a quality-of-service (QoS) parameter, a network bandwidth parameter, a network loading parameter, and a flow type parameter.

30. The infrastructure node of claim 27, wherein the message is at least one of a binding acknowledgement (BA) message and a generic notification (GN) message.

31. The infrastructure node of claim 27, wherein the selected node comprises one of a mobile node (MN) and a mobile access gateway (MAG).

32. The infrastructure node of claim 27, wherein the infrastructure node comprises a home agent.

33. A method operable by an infrastructure node for flow control in a communication network, the method comprising:
  maintaining a mapping between home addresses (HoAs) and care-of-addresses (CoAs) associated with one or more nodes;
  maintaining multiple CoAs associated with a selected node, wherein each CoA identifies one of a plurality of access networks associated with the selected node;
  determining access networks to be used for uplink transmissions of flows from the selected node, wherein the determined access networks are the plurality of access networks associated with the selected node;
  determining selected CoAs associated with the selected node, wherein the selected CoAs identifies the determined access networks; and
  transmitting a message to the selected node, wherein the message comprises a mapping between the flows and the selected CoAs, wherein the mapping sets forth how the flows transmitted from the selected node in the uplink communications are to be routed.

34. The method of claim 33, wherein said determining a selected CoA associated with the selected node comprises determining the selected CoA based on at least one parameter selected from network, device, and flow parameters.

35. The method of claim 34, wherein the network parameters comprise at least one of a quality-of-service (QoS) parameter, a network bandwidth parameter, a network loading parameter, and a flow type parameter.

36. The method of claim 33, wherein of the message is at least one of a binding acknowledgement (BA) message and a generic notification (GN) message.

37. The method of claim 33, wherein the selected node comprises one of a mobile node (MN) and a mobile access gateway (MAG).

38. The method of claim 33, wherein the infrastructure node comprises a home agent.

39. A non-transitory computer-readable medium having stored thereon computer executable instructions configured to cause a computer to perform operations to provide flow control in a communication network, the operations comprising:
  maintaining a mapping between home addresses (HoAs) and care-of addresses (CoAs) associated with one or more nodes;
  maintaining multiple CoAs associated with a selected node, wherein each CoA identifies one of a plurality of access networks associated with the selected node;
  determining access networks to be used for uplink transmissions of flows from a selected node, wherein the determined access networks are the plurality of access networks associated with the selected node;
  determining selected CoAs associated with the selected node, wherein the selected CoAs identifies the determined access networks; and
  transmitting a message to the selected node wherein the message comprises a mapping between the flows and the selected CoAs, wherein the mapping sets forth how the flows transmitted from the selected node in the uplink communications are to be routed.

40. The non-transitory computer-readable medium of claim 39, wherein the stored computer executable instructions are further configured to cause a computer to determine the selected CoA based on at least one parameter selected from network, device, and flow parameters.

41. The non-transitory computer-readable medium of claim 40, wherein the network parameters comprise at least one of a quality-of-service (QoS) parameter, a network bandwidth parameter, a network loading parameter, and a flow type parameter.

42. The non-transitory computer-readable medium of claim 39, wherein the stored computer executable instructions are further configured to cause a computer to perform operations such that the message is at least one of a binding acknowledgement (BA) message and a generic notification (GN) message.

43. The non-transitory computer-readable medium of claim 39, wherein the selected node comprises one of a mobile node (MN) and a mobile access gateway (MAG).

44. The non-transitory computer-readable medium of claim 39, wherein the stored computer executable instructions are executable by a processor at a home agent.

* * * * *